(12) United States Patent
Seo et al.

(10) Patent No.: US 11,991,584 B2
(45) Date of Patent: May 21, 2024

(54) VISITOR IDENTIFICATION SYSTEM

(71) Applicants: Young Kyu Seo, Hwaseong-si (KR); Chang Kyung Park, Hwaseong-si (KR)

(72) Inventors: Young Kyu Seo, Hwaseong-si (KR); Chang Kyung Park, Hwaseong-si (KR)

( * ) Notice: Subject to any disclaimer, the term of this patent is extended or adjusted under 35 U.S.C. 154(b) by 370 days.

(21) Appl. No.: 17/601,057

(22) PCT Filed: Mar. 30, 2020

(86) PCT No.: PCT/KR2020/003970
§ 371 (c)(1),
(2) Date: Oct. 2, 2021

(87) PCT Pub. No.: WO2020/204432
PCT Pub. Date: Oct. 8, 2020

(65) Prior Publication Data
US 2022/0159409 A1 May 19, 2022

(30) Foreign Application Priority Data

Apr. 2, 2019 (KR) .................. 10-2019-0038741
Jan. 15, 2020 (KR) .................. 10-2020-0005458

(51) Int. Cl.
*H04W 4/021* (2018.01)
*H04W 4/20* (2018.01)
*H04W 4/80* (2018.01)

(52) U.S. Cl.
CPC ............. *H04W 4/021* (2013.01); *H04W 4/20* (2013.01); *H04W 4/80* (2018.02)

(58) Field of Classification Search
CPC .................. H04M 1/725; H04W 12/08
(Continued)

(56) References Cited

U.S. PATENT DOCUMENTS

2014/0293754 A1* 10/2014 Jang .................. G08C 23/02
367/199
2018/0058132 A1* 3/2018 Clift .................. E05F 15/70
(Continued)

FOREIGN PATENT DOCUMENTS

KR 10-2013-0000635 A 1/2013
KR 10-2014-0006640 A 1/2014
(Continued)

OTHER PUBLICATIONS

International Search Report of PCT/KR2020/003970 published on Aug. 10, 2020.
Written opinion of PCT/KR2020/003970 published on Aug. 10, 2020.

*Primary Examiner* — Fabricio R Murillo Garcia

(57) ABSTRACT

Provided is a visitor identification system, including: a wireless transmitter; a visitor application; and a management server; wherein the wireless transmitter is installed by a resident and transmits a near field wireless signal; wherein the visitor application receives the near field wireless signal from the wireless transmitter, extracts a first identifier from the wireless transmitter, and transmits the first identifier to the management server, wherein the first identifier is unique to the wireless transmitter; wherein the management server receives the first identifier from the visitor application and performs one or more predetermined tasks so that a resident can verify identity of a visitor.

9 Claims, 3 Drawing Sheets

(58) Field of Classification Search
USPC .................................................... 455/414.2
See application file for complete search history.

(56) References Cited

U.S. PATENT DOCUMENTS

2019/0172288 A1\* 6/2019 Tietz ...................... G06Q 10/08
2019/0251771 A1\* 8/2019 Troesch ................... G07C 9/27
2020/0244452 A1\* 7/2020 Lacava ............... H04L 63/0861

FOREIGN PATENT DOCUMENTS

| KR | 10-2014-0122993 A | 10/2014 |
| KR | 10-1514394 B1 | 4/2015 |
| KR | 10-2016-0030834 A | 3/2016 |
| KR | 10-1716406 B1 | 3/2017 |

\* cited by examiner

VISITOR IDENTIFICATION SYSTEM

TECHNICAL FIELD

The present invention relates to the visitor identification system.

BACKGROUND OF THE INVENTION

Break-in crimes in residence areas are increasing. A person or a senior who lives alone is especially vulnerable to the break-in crime. In response to an increase in the number of a single-member household or a single senior household, the requirement to prevent a break-in crime is getting important. For example, Korean Patent No. 10-1514394 discloses a visitor identification system using Wi-Fi.

This system uses an external doorbell connected with a wireless Internet phone through Wi-Fi. A resident can check and have a video call conversation with a visitor through a smartphone to verify the identity of the visitor.

Problems to be Solved

An object of the present invention is to provide a simplified system for a resident to identify a visitor before letting the visitor into his/her residence.

SUMMARY OF INVENTION

A visitor identification system according to an aspect includes a wireless transmitter; a visitor application; and a management server. The wireless transmitter is installed by a resident and transmits a near field wireless signal (also referred to as short-distance wireless signal). The visitor application receives the near field wireless signal from the wireless transmitter, extracts a first identifier from the near field wireless signal, and transmits the first identifier to the management server. The first identifier is unique to the wireless transmitter. The management server receives the first identifier from the visitor application and performs one or more predetermined tasks so that a resident can verify the identity of a visitor. The wireless transmitter broadcasts the near field wireless signal upon manipulation of the visitor. In addition, the wireless transmitter is fixedly installed outside an entrance of a residence area of the resident.

The wireless transmitter further generates a predetermined sound wave upon manipulation of the visitor. When the predetermined sound wave is received, the visitor application checks whether a communication resource is in an active state. The communication resource can receive the near field wireless signal from a doorbell. When the communication resource is an inactive state, the visitor application switches the state of the communication resource to an active state. The first identifier is mapped with the resident. The management server (i) identifies the resident who is mapped with the first identifier and (ii) transmits visitor information to the resident.

After identifying the resident who is mapped with the first identifier, the management server (i) provides a phone number of the visitor to the resident, (ii) provides a phone number of the resident to the visitor, or (iii) both. After identifying the resident who is mapped with the first identifier, the management server arranges a phone call between the visitor and the resident. The phone call is a video call, wherein the video call is arranged in a unilateral direction from the visitor to the resident in real time.

The method of identifying a visitor includes: a step for a visitor terminal to receive a near field wireless signal transmitted from a wireless transmitter, wherein the wireless transmitter is installed outside an entrance of a residence area of a resident, wherein the near field wireless signal is generated upon manipulation of the wireless transmitter by a visitor; a step for a visitor terminal to extract a first identifier from the near field wireless signal and transmits the first identifier to a management server, wherein the first identifier is unique to the wireless transmitter; and a step for the management server to receive the first identifier from the visitor terminal and perform one or more predetermined tasks to verify the identity of the visitor.

The step for the management server to perform one or more predetermined tasks includes (i) checking resident information in a database, and (ii) transmitting visitor information to a resident terminal. The resident information is mapped with the first identifier.

Advantages of Invention

According to the present invention, a resident can verify the identity of a visitor in advance. The wireless transmitter (doorbell) according to the present invention is inexpensive and easy to install. Unlike a conventional visitor identification system, there is no need to build a system within the residence.

DETAILED DESCRIPTION OF INVENTION

The present invention will become more apparent through preferred embodiments described below and the accompanying drawings. Hereinafter, the present invention will be described in detail so that those skilled in the art can easily understand and reproduce it through these examples.

Figure 1:
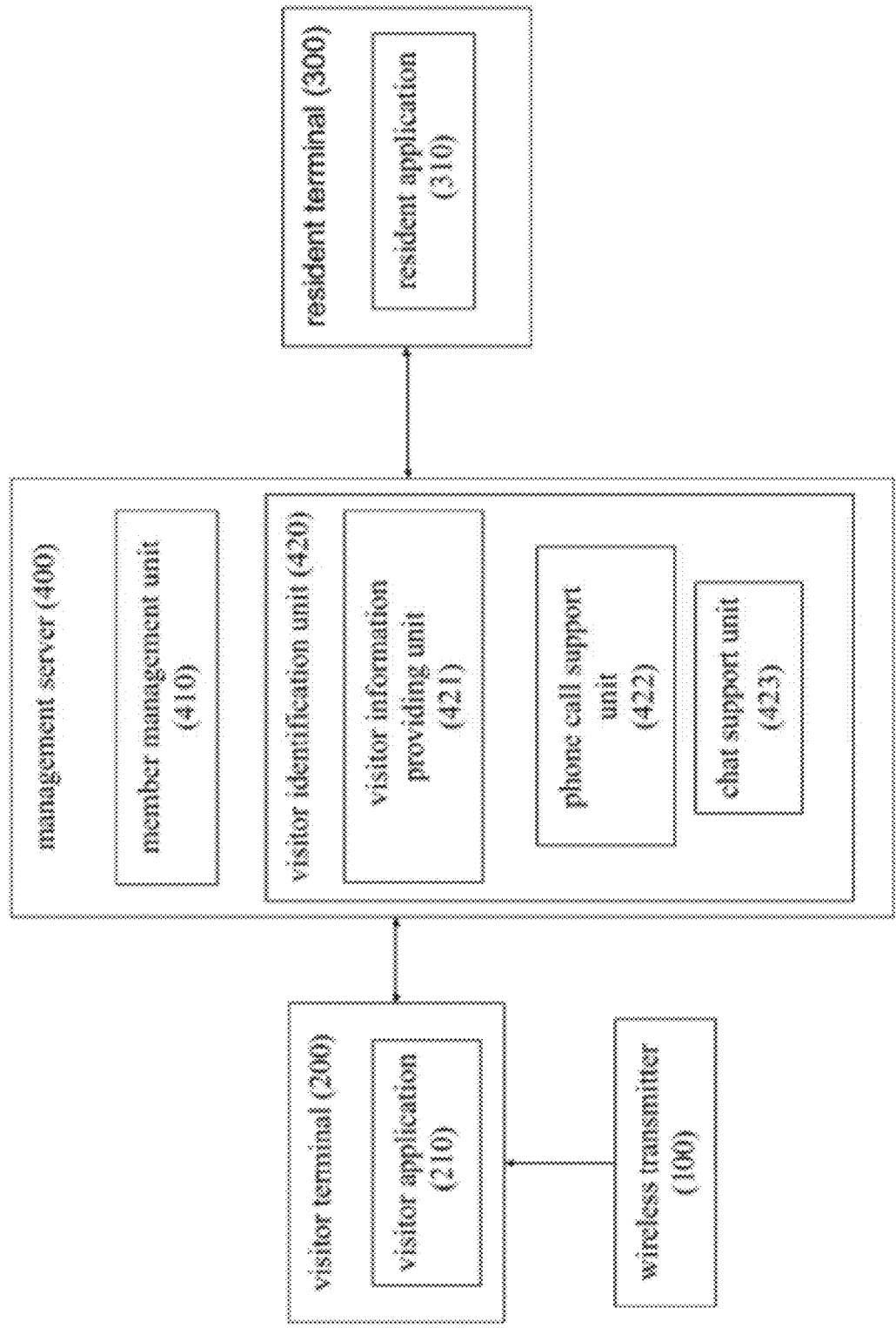
FIG. 1 is a block diagram of a visitor identification system according to an embodiment.

FIG. 1 is a block diagram of a visitor identification system according to an embodiment. A wireless transmitter (100) is a device of a resident which transmits a near field wireless signal. The near field wireless signal includes a first identifier (hereinafter, referred to as a "first ID" or a "transmitter ID") uniquely assigned to the wireless transmitter (100).

The wireless transmitter (100) is not a mobile device, but a device which is fixedly installed somewhere. For example, the wireless transmitter (100) is fixedly installed outside an entrance of a residence area of the resident. In one embodiment, the wireless transmitter (100) transmits a near field wireless signal upon manipulation of the visitor. That is, only when a visitor directly manipulates the wireless transmitter (100), the near field wireless signal may be transmitted.

The near field communication is not limited in type or operation. For example, the near field communication module of the wireless transmitter (100) is a Bluetooth beacon. The wireless transmitter (100) may include a doorbell. In this case, the wireless transmitter (100) may be called a "wireless doorbell." In case the near field communication module of the wireless transmitter (100) is a Bluetooth beacon, the wireless transmitter (100) may be called a "beacon doorbell."

The wireless doorbell (100) may include a button activated by a physical pressure or a touch-type button. When the button is pressed or touched, a near field wireless signal including the first ID of the wireless doorbell (100) is transmitted. The wireless transmitter (100) may broadcast a near field wireless signal according to a near field wireless communication method.

In this case, the near field wireless signal may be received by two or more visitor applications (210) located in the vicinity of the wireless transmitter (100). Unintentionally, a near field wireless signal may be provided to a visitor other than the actual visitor. In order to prevent such a problem, the signal transmission distance of the wireless transmitter (100) may be limited to within a predetermined distance. For example, it can be limited to within 30 cm.

A visitor terminal (200) is a mobile terminal such as a smartphone. Both the visitor terminal (200) and a resident terminal (300) are communication terminals, and may be mobile terminals such as smartphones. The visitor terminal (200) and the resident terminal (300) are terminals used by different users. When a smartphone is used by the visitor, the smartphone is called the visitor terminal (200). Likewise, when a smartphone is used by the resident, the smartphone is called the resident terminal (300).

A visitor application (210) and a resident application (310) may be installed and executed on the visitor terminal (200) and the resident terminal (300), respectively. The visitor application (210) and the resident application (310) may in fact be the same application. The definition of the terms "visitor" and "resident" should not be limitedly construed. To this end, they may be replaced with the terms "first user" and "second user", respectively.

A management server (400) is capable of communicating with the visitor terminal (200) and the resident terminal (300) through a network. The management server (400) may include one or more servers. The management server (400) allows a resident to verify the identity of a visitor by interworking with the visitor application (210) and the resident application (310). The management server (400) may include a member management unit (410) and a visitor identification unit (420). All of these may be implemented as software, and may be executed by one or more processors.

The member management unit (410) stores and manages information about users (also referred to as registered members) in a database. The users are persons who sign up as members through a web or an application. The member management unit (410) may manage the registered members. The registered members may be classified into a resident member and a visitor member.

The resident member information includes basic information such as name and phone number. The resident member's transmitter ID is also included. The basic information of the resident member and the transmitter ID are mapped with each other. In addition, the visitor member information may be provided to the resident. The visitor information may include a name, a phone number, and an image of a face image of a given visitor.

In an embodiment, the visitor member may be a company (organization) that provides its service by a door-to-door visit, such as a door-to-door sales company, a door-to-door care service company, a delivery company, and a courier company. In another embodiment, the company member may provide its employee information to the visitor identification system. In this case, individual employees are registered as visitor members.

As such, when a visitor member is an employee of a given company that provides a service by a door-to-door visit, the visitor information may further include the company's name, the company's phone number, the employee's ID, and the like. Additionally, the visitor information may also include a purpose or reason for visit in a text format. The purpose or reason for visit may be provided to inform the resident.

Meanwhile, a given member can be a resident in one transaction and be a visitor in another transaction. Thus, information of a given member may include both information as the resident member and as the visitor member.

The visitor identification unit (420) performs one or more predetermined tasks to allow the resident to verify the identity of the visitor. The visitor application (210) receives the near field wireless signal from the wireless transmitter (100), extracts a transmitter ID uniquely assigned to the wireless transmitter (100) from the near field wireless signal, and transmits the transmitter ID to the management server (400). When the visitor identification unit (420) receives the transmitter ID of the wireless transmitter (100) from the visitor application (210), it performs one or more predetermined tasks so that a resident can verify the identity of a visitor.

As shown in FIG. 1, the visitor identification unit (420) may include at least one of a visitor information providing unit (421), a phone call support unit (422), and a chat support unit (423). Each of the visitor information providing unit (421), the phone call supporting unit (422), and the chat supporting unit (423) performs a predetermined task so that the resident can verify the identity of a visitor. The visitor information providing unit (421) provides visitor information to a resident.

It enquires the database using the transmitter ID received from the visitor application (210), locates the resident information, and transmits the visitor information stored in the database to the resident terminal (300). The visitor information providing unit (421) may extract the visitor information from the database and transmit the visitor information to the resident terminal (300).

In one embodiment, the visitor information may be extracted from a general database which stores member information. In another embodiment, the visitor information may be extracted from a special database which manages member information in a specific manner or for a specific purpose. In addition, the visitor information may be transmitted as a message such as SMS or may be transmitted to the resident application (310).

When the visitor application (210) receives the near field wireless signal from the wireless transmitter (100), the visitor application (210) requests the visitor to input the purpose of the visit. The purpose-of-visit information may be inputted in a text format. The visitor application (210) transmits the purpose-of-visit information to the management server (400) together with the transmitter ID.

The purpose-of-visit information may be part of the visitor information. The visitor information providing unit (421) transmits the visitor information, which includes the purpose-of-visit information, to the resident terminal (300). In one embodiment, the purpose of the visit may be required to be provided directly from the visitor on every and each visit. In another embodiment, not only the purpose of the visit but also the entire visitor information may be required to be provided directly from the visitor on each visit.

The phone call support unit (422) supports a voice call or a video call between a visitor and a resident. In a support method, the phone call support unit (422) transmits a resident's phone number to the visitor terminal (200). The resident's phone number is mapped to the transmitter ID.

The resident's phone number may be transmitted to the visitor terminal (200) via SMS or the like, or may be transmitted to the visitor application (210) installed on the visitor terminal (200). In this case, for better security, a one-time temporary phone number may be transmitted, instead of the actual phone number of the resident.

In another embodiment, the phone call support unit (422) checks the resident information, which is mapped to the transmitter ID. Then, based on the resident information located as such, the phone call support unit (422) transmits the visitor phone number to the resident terminal (300).

The visitor phone number may also be transmitted via SMS to the visitor terminal (200) or may be transmitted to the visitor application (210) of the visitor terminal (200). In addition, for better security, a one-time temporary phone number may be used as the visitor's phone number, instead of an actual phone number of the visitor. Accordingly, a visitor or a resident can directly make a call to the other party. The call may be a voice call or a video call.

On the other hand, the visitor information provided by the visitor information providing unit (421) to the resident terminal (300) may include a visitor phone number. In this case, a resident can directly call the visitor using the visitor information. The call may be a voice call or a video call. In addition, for better security, the visitor phone number that can be included in the visitor information may be a one-time temporary phone number.

In an embodiment, the phone call support unit (422) allows a direct call connection between the visitor terminal (200) and the resident terminal (300).

In an embodiment, the phone call support unit (422) checks (i) the resident phone number mapped to the transmitter ID and (ii) the visitor phone number stored in the database. Then, the phone call support unit (422) establishes a two-way phone connection (also referred to as bidirectional call connection) so that a call is capable between the resident terminal (300) and the visitor terminal (200). For example, the phone call support unit (422) makes a call to each of the resident terminal (300) and the visitor terminal (200) and then establishes a call connection path between the resident terminal (300) and the visitor terminal (200). The phone call support unit (422) may perform a two-way phone connection between the visitor terminal (200) and the resident terminal (300) only when a call connection command is received from the visitor application (210) or the resident application (310).

For example, first, the phone call support unit (422) checks or locates the resident phone number mapped to the transmitter ID. Then, the phone call support unit (422) send a response to the visitor application (210), e.g., by displaying or activating a call mode on the visitor's application (210). A call button may be displayed on the screen. Accordingly, when a visitor executes the call, the visitor application (210) commands the management server (400) to establish a call connection. The phone call support unit (422) of the management server (400) carries out a two-way phone connection procedure to establish a call path between the visitor terminal (200) and the resident terminal (300).

As another example, when the resident application (310) receives the visitor information, the resident application (310) may receive a call mode execution command as well. The resident application (310) displays a call mode screen.

A call can be executed by pressing a call button displayed on the call mode screen, as described above. When a resident confirms the identity of a visitor through the visitor information and wants to make a phone call, the resident application (310) commands the management server (400) to establish a call connection. The phone call support unit (422) of the management server (400) carries out a two-way phone connection procedure to establish a call path between the resident terminal (300) and the visitor terminal (200).

Either the visitor application (210) or the resident application (310) may be provided with a call function. Accordingly, the phone call support unit (422) may perform a phone connection so that a call path is established between the visitor application (210) and the resident application (310) through a data communication network.

In case the visitor application (210) or the resident application (310) receives the other party's phone number from the management server (400), a direct phone connection is available through a phone network.

In addition, when a telephone connection for a video call is made between a visitor and a resident, the video call data may be transmitted in real time only in one direction, e.g., from visitor to resident. To this end, the resident application (310) may be set such that a camera is inactivated when a video call is connected. After checking the resident information mapped to the transmitter ID, the chat support unit (423) creates a temporary chat window for chatting between the visitor application (210) and the resident application (310) so that the visitor and the resident can chat with each other.

In an embodiment, after receiving visitor information, the resident application (310) displays a chat button for chatting with the visitor in addition to displaying the visitor information on the screen. When a resident selects the chat button, a resident's chatting request is transmitted to the management server (400). The chat support unit (423) of the management server (400) creates a temporary chat window and displays the temporary chat window on the visitor application (210) and the resident application (310).

When the communication resource of the visitor terminal (200) is in an inactive state, the visitor application (210) may not receive the near field wireless signal from the wireless transmitter (100). The communication resource of the visitor terminal (200) is required for the visitor application (210) to receive the near field wireless signal from the wireless transmitter (100). In order to prevent this problem, when the near field wireless signal from the wireless transmitter (100) is transmitted, the communication resource of the visitor application (210) should be in an active state.

In an embodiment, the wireless transmitter (100) generates a predetermined sound wave in an audible sound band or an inaudible sound band in response to a visitor operation at the same time of transmitting a near field wireless signal. In another embodiment, the wireless transmitter (100) may transmit a near field wireless signal later after generating a sound wave. The visitor application (210) analyzes the sound wave received through a sound wave receiver of the visitor terminal (200).

When it is determined that the sound wave is the predetermined sound wave, the visitor application (210) checks the state of the communication resource for receiving the near field wireless signal from the wireless transmitter (100). When it is determined that the communication resource is in an inactive state, the communication resource is switched to an active state. Here, the communication resource may be Bluetooth.

Figure 2:
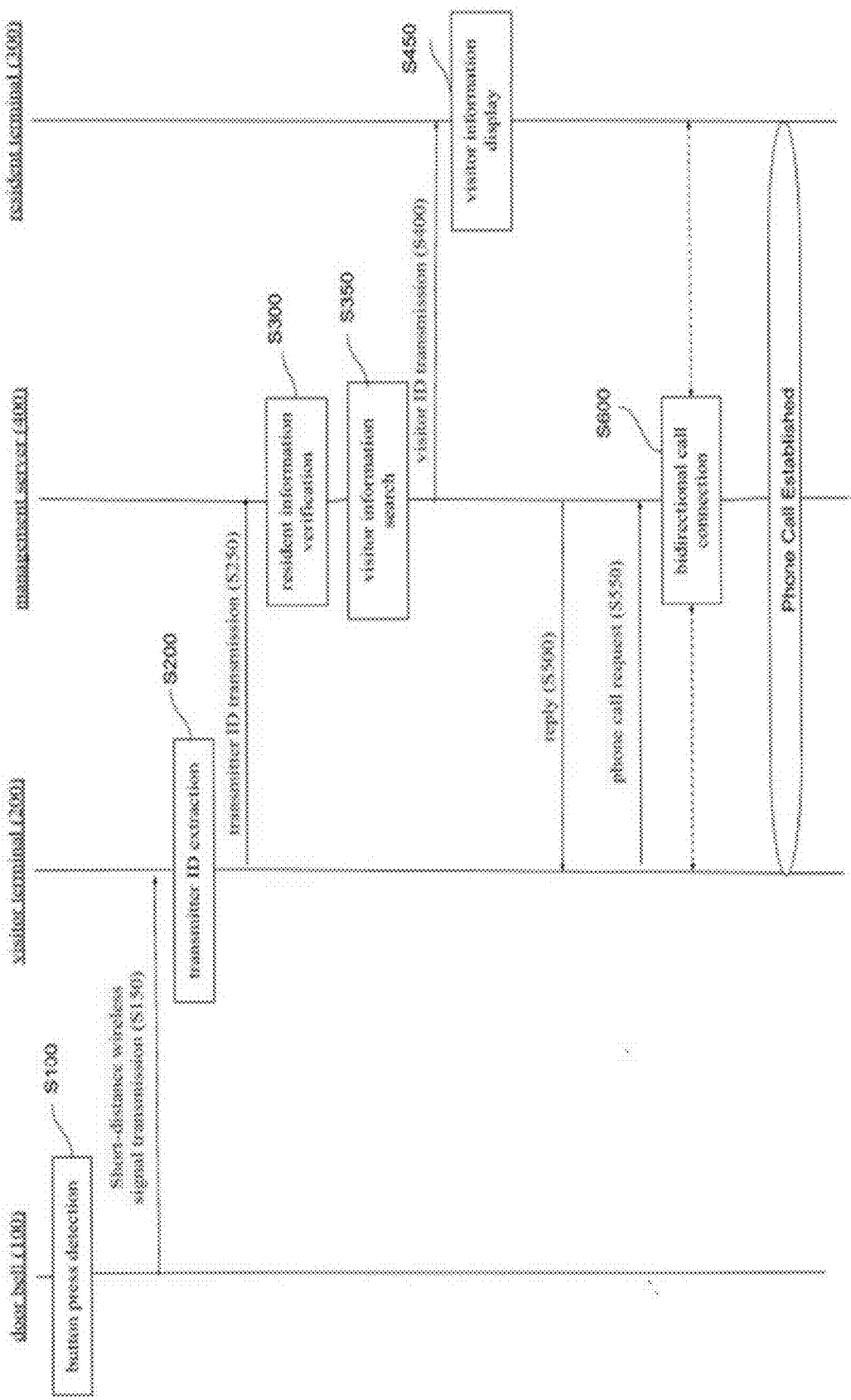
FIG. 2 is a flowchart showing how to verify a visitor according to an embodiment.

FIG. 2 is a flowchart showing how to verify a visitor according to an embodiment. When a visitor of a residence presses the button of the doorbell (100) installed outside a doorway, the doorbell (100) detects the visitor's action of pressing the button and transmits a near field wireless signal (S100) (S150). As described above, the doorbell (100) may further generate sound waves in addition to transmitting the near field wireless signal. The sound waves may be ultrasonic waves.

The visitor terminal (200) receives the near field wireless signal from the doorbell (100) and extracts a transmitter ID from the near field wireless signal (S200) received. The visitor terminal (200) transmits the transmitter ID extracted to the management server (400) (S250). In this case, an ID for identifying the visitor may also be transmitted.

Based on the transmitter ID received from the visitor terminal (200) (S300), The management server (400) searches the database and retrieves (or collects) the resident information. The resident information may be the resident's phone number mapped to the transmitter ID.

The management server (400) searches the database to retrieve or collect the visitor information. The visitor information is provided to the resident (S350). The management server (400) may retrieve the visitor information from the database using the visitor ID received in step S250.

The management server (400) transmits the visitor information retrieved to the resident terminal (300) (S400). The visitor information may include a visitor's face image, a visitor's name, a visitor's company, and the purpose of the visit. Examples of information about the purpose of visit include "electric meter reading" and "delivery of food".

The resident terminal (300) receives the visitor information and displays it on its screen so that the resident can verify the identity of the visitor in advance (S450). This system allows a resident to check the visitor information merely by the visitor's action of pressing the doorbell.

In response to the transmitter ID transmitted from the visitor terminal (200), the management server (400) responds back to the visitor terminal (200). (S500). The Step S500 may be performed immediately after the step S300, or may be performed after the visitor information is provided to the resident. In the Step S500, the management server (400) may inquire whether to make a phone call with the resident.

Upon the back response from the management server (400), the visitor terminal (200) may execute a call mode by displaying on its screen a call button for phone connection with the resident. When the call button is selected by the visitor, the visitor terminal (200) transmits a call request to the management server (400) about providing the transmitter ID. Accordingly, the management server (400) establishes a call path between the visitor terminal (200) and the resident terminal (300)(S600). The call path may be for a two-way telephone connection.

The management server (400) may transmit visitor information including the visitor phone number to the resident terminal (300) in the Step S400 and may transmit the resident phone number to the visitor terminal (200) in the Step S500. In this case, the visitor or the resident can make a direct call using the other party's phone number. To protect the phone number, the visitor phone number or the resident phone number may be a one-time temporary phone number.

Meanwhile, although not shown in FIG. 2, in a video call made between the visitor application (210) and the resident application (310), the video information may be transmitted in an unilateral manner so that the resident application (310) can receive the video information from the visitor, but not vice versa. At least part of the operations executed on the visitor terminal (200) and the resident terminal (300) described in FIG. 2 may be performed through the visitor application (210) and the resident application (310), respectively.

Figure 3:
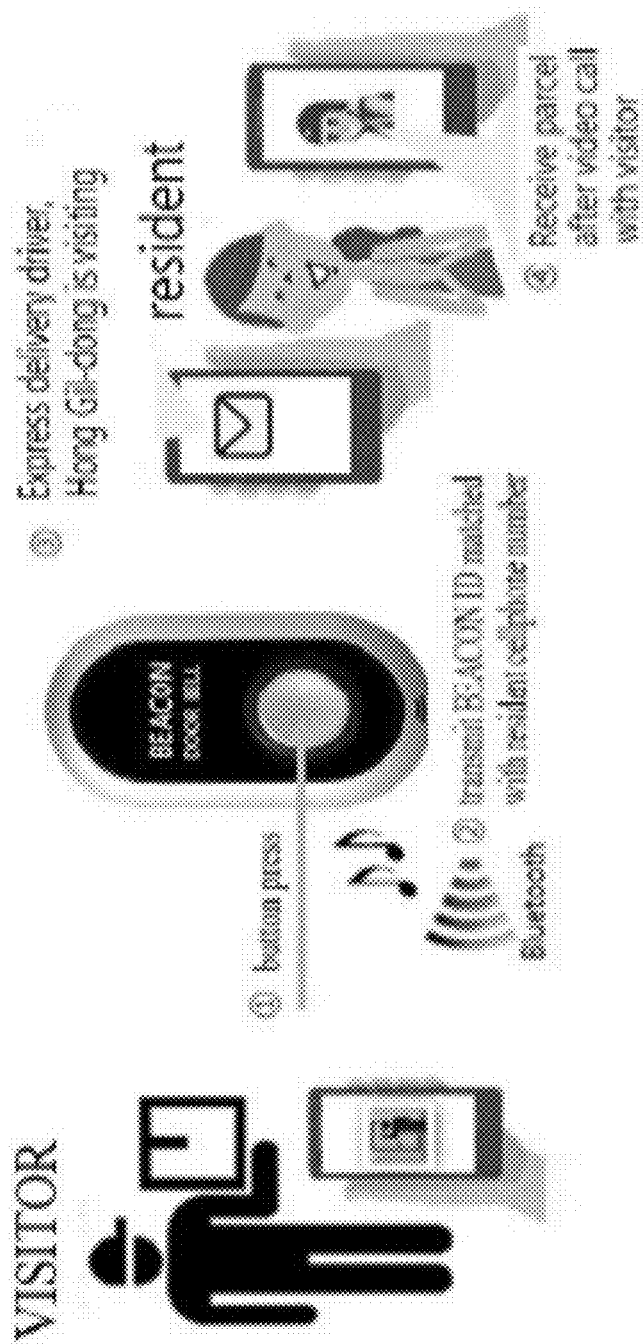
FIG. 3 shows how to verify a visitor who is a package delivery person.

FIG. 3 shows how to verify a visitor who is a package delivery person. When a visitor visits the residence of a resident and simply presses a button on the doorbell, the resident can check the visitor information on his or her mobile terminal and verify the visitor's identity through a video call with the visitor.

In addition, the resident may unlock a digital door lock after verifying the identity of the visitor to allow the visitor to enter and exit the residence. Even if the resident is out of the residence, unlocking the digital door lock may be remotely controlled through the resident application (310). To this end, the resident application (310) may be connected to a home network system.

So far, preferred embodiments with respect to the present invention have been described. Those of ordinary skill in the art to which the present invention pertains will understand that the present invention can be implemented in a modified form without departing from the essential characteristics of the present invention. The disclosed embodiments should be considered illustrative, rather than limiting the scope of the present invention. The scope of the present invention should be determined by the claims rather than by the foregoing description. The scope of the present invention should be construed to include an equivalent to the embodiments presented above.

What is claimed is:

1. A visitor identification system, comprising:
a wireless doorbell; a visitor application; a management server, a communication resource provided in the visitor application,
wherein the wireless doorbell is installed by a resident and transmits a near field wireless signal,
wherein the wireless doorbell further generates a sound wave upon first manipulation of a visitor,
wherein the visitor application receives the sound wave from the wireless doorbell, determines whether the sound wave received is a predetermined sound wave, and detects whether the communication resource is in an active state or in an inactive state,
wherein the visitor application switches the communication resource to the active state when it is found that (i) the sound wave received is the predetermined sound wave, and (ii) the communication resource is in the inactive state so that the visitor application receives the near field wireless signal from the wireless doorbell,
wherein the visitor application maintains the communication resource in the active state when it is found that (i) the sound wave received is the predetermined sound wave, and (ii) the communication resource is in the active state so that the visitor application receives the near field wireless signal from the wireless doorbell,
wherein the visitor application receives the near field wireless signal from the wireless doorbell, extracts a first identifier from the wireless doorbell, and transmits the first identifier to the management server, wherein the first identifier is unique to the wireless doorbell,
wherein the management server receives the first identifier from the visitor application and performs one or more predetermined tasks so that the resident can verify identity of the visitor.

2. The visitor identification system of claim 1,
wherein the wireless doorbell broadcasts the near field wireless signal upon second manipulation of the visitor.

3. The visitor identification system of claim 2,
wherein the wireless doorbell is fixedly installed outside an entrance of a residence area of the resident.

4. The visitor identification system of claim 1,
wherein the first identifier is mapped with the resident,
wherein the management server (i) identifies the resident who is mapped with the first identifier and (ii) transmits visitor information to the resident.

5. The visitor identification system of claim 1,
wherein, after identifying the resident who is mapped with the first identifier, the management server (i) provides a first phone number of the visitor to the resident, (ii) provides a second phone number of the resident to the visitor, or (iii) both.

6. The visitor identification system of claim 1,
wherein, after identifying the resident who is mapped with the first identifier, the management server arranges a phone call between the visitor and the resident.

7. The visitor identification system of claim 6,
wherein the phone call is a video call,
wherein the video call is arranged in a unilateral direction from the visitor to the resident in real time.

8. A method of identifying a visitor, comprising:
a first step for a visitor terminal to receive a near field wireless signal and a sound wave transmitted from a wireless doorbell, wherein the wireless doorbell is installed outside an entrance of a residence area of a resident, wherein the near field wireless signal and the sound wave are generated upon manipulation of the wireless doorbell by the visitor;
a second step for the visitor terminal to determine whether the sound wave received is a predetermined sound wave, and to detect whether a communication resource is in an active state or in an inactive state, wherein the communication resource is provided in the visitor terminal;
a third step for the visitor terminal to switch the communication resource to the active state when it is found that (i) the sound wave received is the predetermined sound wave, and (ii) the communication resource is in the inactive state so that the visitor application receives the near field wireless signal from the wireless doorbell;
a fourth step for the visitor terminal to maintain the communication resource in the active state when it is found that (i) the sound wave received is the predetermined sound wave, and (ii) the communication resource is in the active state so that the visitor application receives the near field wireless signal from the wireless doorbell;
a fifth step for the visitor terminal to extract a first identifier from the near field wireless signal and to transmit the first identifier to the management server, wherein the first identifier is unique to the wireless doorbell; and
a sixth step for the management server to receive the first identifier from the visitor terminal and to perform one or more predetermined tasks to verify identity of the visitor.

9. The method of claim 8,
wherein the one or more predetermined tasks include (i) checking resident information in a database, and (ii) transmitting visitor information to the resident,
wherein the resident information is mapped with the first identifier.

* * * * *